(12) United States Patent  (10) Patent No.: US 6,229,677 B1
Hudson et al.  (45) Date of Patent: *May 8, 2001

(54) DISC DRIVE ACTUATOR ARM ASSEMBLY WITH OUTER ARM Z-HEIGHT LESS THAN INNER ARM Z-HEIGHT

(75) Inventors: Andrew John Hudson, Santa Cruz; Michael John Raffetto, Scotts Valley, both of CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,376

(22) Filed: Sep. 9, 1997

Related U.S. Application Data (60) Division of application No. 08/670,577, filed on Jun. 26, 1996, now abandoned, which is a continuation-in-part of application No. 08/413,235, filed on Mar. 30, 1995, now abandoned, which is a division of application No. 08/152,210, filed on Nov. 12, 1993, now Pat. No. 5,459,921.

(51) Int. Cl.[7] .............................. G11B 5/48; G11B 33/12
(52) U.S. Cl. ..................................... 360/266.1; 360/98.01
(58) Field of Search ................................... 360/106, 104, 360/98.01, 97.01, 266.1, 265.7

(56) References Cited

U.S. PATENT DOCUMENTS

| | | | |
|---|---|---|---|
| 4,783,710 | 11/1988 | Salyer et al. | 360/104 |
| 4,829,395 | 5/1989 | Coon et al. | 360/104 |
| 4,853,812 | 8/1989 | Daito et al. | 360/104 |
| 4,912,583 | * 3/1990 | Hinlein | 360/104 |
| 4,922,356 | 5/1990 | Yamaguchi et al. | 360/104 |
| 4,994,931 | 2/1991 | Foote | 360/106 |
| 5,003,420 | * 3/1991 | Hinlein | 360/106 |
| 5,027,242 | 6/1991 | Nishida et al. | 360/106 |
| 5,047,883 | 9/1991 | Aldrich et al. | 360/109 |
| 5,053,904 | 10/1991 | Yamano et al. | 360/103 |
| 5,099,373 | 3/1992 | Shibata et al. | 360/104 |
| 5,138,507 | 8/1992 | Zarouri et al. | 360/104 |
| 5,153,794 | 10/1992 | Hinlein | 360/104 |
| 5,184,265 | 2/1993 | Foote et al. | 360/106 |
| 5,218,496 | 6/1993 | Kaczeus | 360/106 |
| 5,223,993 | 6/1993 | Squires et al. | 360/98.01 |
| 5,227,937 | 7/1993 | Magnusson et al. | 360/104 |
| 5,293,289 | 3/1994 | Nagase | 360/104 |
| 5,299,082 | * 3/1994 | Ananth et al. | 360/106 |
| 5,313,355 | 5/1994 | Hagen | 360/104 |
| 5,343,345 | 8/1994 | Gilovich | 360/104 |
| 5,629,820 | * 5/1997 | Koriyama | 360/104 |

* cited by examiner

*Primary Examiner*—Craig A. Renner
(74) *Attorney, Agent, or Firm*—Thomason, Moser & Patterson, LLP (57) ABSTRACT

Differing gram loads and actuator arm resonances are compensated for through the method and apparatus of positioning z-height of outer actuator arm at an optimal height. Specifically, an actuator arm driven by a closed loop servo motor system for a disc drive system is configured so that the outer upper and lower actuator arms are positioned at an optimum distance, called optimum z-height, from the disc surface. At the optimum z-height position, the gram load of the outer actuator arms are shifted as near as possible to the gram load of the inner actuator arms. At the optimum z-height, the resonances on the head gimbal assemblies of the inner and outer actuator arms are closest.

6 Claims, 10 Drawing Sheets

DISC DRIVE ACTUATOR ARM ASSEMBLY WITH OUTER ARM Z-HEIGHT LESS THAN INNER ARM Z-HEIGHT

The present application is a division of U.S. application Ser. No. 08/670,577, filed Jun. 26, 1996, now abandoned, which is a continuation-in-part of U.S. application Ser. No. 08/413,235, filed Mar. 30, 1995, now abandoned, which is a division of U.S. application Ser. No. 08/152,210, filed Nov. 12, 1993, now U.S. Pat. No. 5,459,921, issued Oct. 24, 1995.

FIELD OF THE INVENTION

The invention relates generally to an actuator arm apparatus in a disc drive system and to a method of installing the outer actuator arms at a particular optimum distance from the memory disc surface of their corresponding memory discs to compensate for the differences in gram loads counted by the flexibility of the actuator arm that the head gimbal assemblies are mounted on.

BACKGROUND OF THE INVENTION

Disc drive systems read and write information stored on concentric circular tracks on memory discs. Information or data is stored on the surface of the memory discs via a read/write transducer. The data is divided or grouped together in tracks. Transducers, in the form of read/write heads, located on both sides of the memory disc, read and write information on the memory discs when they are accurately positioned over one of the designated or target tracks on the surface of the memory disc. As the memory disc spins and the read/write head is accurately positioned above a target track, the read/write head can store data onto a track by writing onto the memory disc in a particular manner. Similarly, reading data on a memory disc is accomplished by positioning the read/write head above a target track and reading the stored material on the memory disc. To write on or read from different tracks, the read/write head is moved radially across the concentric tracks to the target track.

Typical disc drives have a plurality of memory discs spaced apart and rotating about a common spindle. Because of the importance of positioning the read/write head substantially parallel to the memory disc surface, a head gimbal assembly is installed on an actuator arm. An actuator arm comprises a flexure, a head gimbal assembly, and a mounting support. The read/write head is found at the distal end of the actuator arm. The proximal end of the actuator arm is coupled to a pivot assembly. The pivot assembly is in turn connected to a servo motor system. The flexure and head gimbal assembly allow the read/write head to gimbal for pitch and roll to follow fluctuations in the imperfect memory disc surface but restrict motion in the radial and circumferential directions of the memory disc. The flexure is coupled to a mounting support coupled to a servo motor. As the disc drive system sends control signals to the motor, the motor rotates, thereby displacing the actuator arm supporting the read/write head across the memory disc in a radial direction to the target track. The control signals indicate to the motor the magnitude and direction of the displacement.

Disc drive systems are very high precision units requiring close dimensional tolerances in manufacturing. In recent years, the size of disc drives have decreased from a 14-inch form factor to 1.8-inch form factor. In contrast, the density of information (bits per inch and tracks per inch) stored on memory discs compatible with such disc drives has increased. To meet the increased density requirements, the recording performance of the read/write head must be optimized. The performance of the read/write head is a function of the distance between the head and the disc surface where the data is stored. Currently, this spacing is as low as 1.5–2.0$\mu$ inches.

Fly-height refers to this spacing as the disc rotates and the read/write head "flies" across the disc surface to position itself over the target track. To ensure proper performance, the head must maintain this fly-height. Fly height is determined by gram load, pitch static attitude, and the appropriate placement of the actuator arm over the disc surface (z-height), as well as mechanical tolerance of the air bearing surface, the disc and other mechanical parameters.

Gram load refers to the load on the head gimbal assembly, or gram load variation with the bending of the outer actuator arms. Middle arms have a load on both sides of the arm, therefore a balanced load. Outer arms have only one load therefore arms bend causing reduction in gram load. The z-height of the mounting support affects the gram load; the lower the z-height, the greater the gram load.

Figure 1:
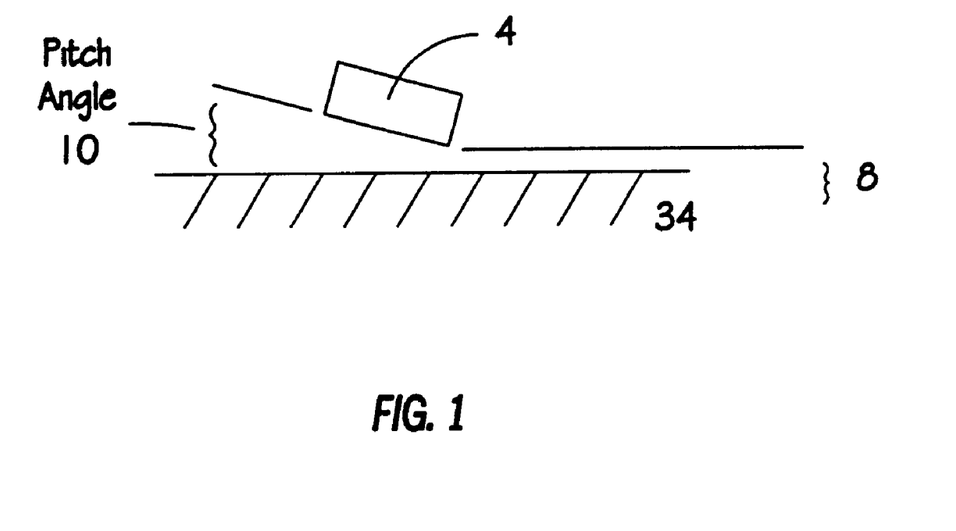
FIG. 1 is a schematic view of a slider and disc useful in understanding some basic definitions.

Pitch static attitude refers to the ability of the read/write head to "ride" with the fluctuations of the laminar flow of air generated by disc rotation and with the uneven disc surface. More particularly, as shown in FIG. 1, pitch angle 10 refers to the vertical angular displacement of the head about the horizontal plane of its "flight path." The read/write head is mounted on a "slider" which has an air bearing surface positioned immediately adjacent but, when the disc is turning, flying over the flat surface of the memory disc at a fly height 8. As the memory disc spins, the laminar flow of air following the memory disc lifts the slider and the read/write head by applying vertical air pressure onto the air bearing surface of the slider, thereby establishing and maintaining this fly height 8.

Almost all disc drive systems have at least two actuator arms. In any single disc drive systems, the two outer actuator arms are not accompanied by any inner actuator arms. In disc drive systems with multiple discs, an outer upper actuator arm and an outer lower actuator arm are accompanied by at least one pair of inner actuator arms. Because most inner actuator arms are installed in a back-to-back configuration, their displacement characteristics are static and fairly equivalent to each other. The outer actuator arms, however, are not installed in a back-to-back configuration and are thus less stable; the outer actuator arms are free to deflect upon an application of force. As a result, gram load, and pitch of the head gimbal assemblies of the outer actuator arms are different from those of the head gimbal assemblies of the inner actuator arms.

Tilt of the flexure arm about the mounting support also affects certain resonances. Tilt is the angular deflection of a flexure about the horizontal plane (vertical deflection). Tilt is not the deflection of the flexure along the horizontal plane.

Prior art designs have not attempted to equalize the gram loads of the head gimbal assembly of the outer actuator arms and the gram loads of the head gimbal assembly of the inner actuator arms. Since prior art actuator arms were thicker and possessed greater mass, different gram loads on the head gimbal assembly, and thus different resonance characteristics, were not a major problem. However, with lower profile disc drives utilizing thinner and lightweight actuator arms, different gram loads on the head gimbal assemblies have emerged as a significant problem. Also, the fact that transducers are flying closer to the disc surface makes tolerance much more important.

Prior art designs have attempted to minimize the effects of the outer and inner actuator arm resonances by increasing the mass or stiffness of the actuator arm or designing new SEEK methods of positioning the read/write head over the target track. These prior art and efforts did not attempt to use the existing actuator arm or a lightweight assembly and adjust the z-height to minimize the negative consequences of distinct arm resonances.

However, these heavier arms require higher power requirements to drive the motor. From a manufacturing standpoint, higher mass assemblies reduce manufacturing yields and increase part cost.

Head lift-off, or vertical shock resistance, is a function of gram load and magnitude of vertical shock impulses. When a large shock impulse in the vertical direction is applied to the actuator arm, the head gimbal assembly "lifts off" and lands back on the disc surface. This damages the memory disc. Damage potential is lower for higher gram loads. By reducing the gram load, the damage threshold is decreased for equivalent shock impulses and thus, the stability of the disc drive system decreases.

New SEEK head positioning methods do not address all of these problems. Although low access times may be achieved, the performance of the system is still degraded due to unwanted and uncompensated resonances of the outer actuator arms.

SUMMARY OF THE INVENTION

An objective of the present invention is to achieve uniform gram load on the sliders throughout the actuator stack.

Another objective of the present invention is to allow the use of thin and lightweight actuator arms without degrading the performance of the servo motor and disc drive. Accordingly, the invention promotes lower profile disc drive systems.

Another object of the invention is to achieve increased stability by aligning the resonances of the inner actuator arms with the resonances of the outer actuator arms close together along the frequency spectrum.

These and other objectives are achieved in accordance with the present invention. An embodiment of the present invention calls for positioning the two outer actuator arms at a particular distance, called the optimum z-height, from the memory disc surface of their corresponding memory discs would shift outer actuator gram load. Significantly, this optimum z-height differs from the z-height of the inner actuator arms and from the presumed z-height. Additionally, the use of lightweight and thin material and identical dimensions for corresponding outer actuator arm components is possible for economic packaging of the disc drive system without sacrificing performance. As long as the outer actuator arms are positioned at the optimum z-height, degradation of performance due to the gram load of the sliders on the outer arms being different than those of the inner arms is minimized.

Since the present invention uses lower mass and lower inertia actuator arms, stability increases, access speed increases, and power requirements to drive the arms decrease.

BRIEF DESCRIPTION OF THE DRAWINGS:

The features and advantages of the present invention will be better understood by reference to the following figures and the detailed description which follows.

DETAILED DESCRIPTION OF A PREFERRED EMBODIMENT

Figure 2:
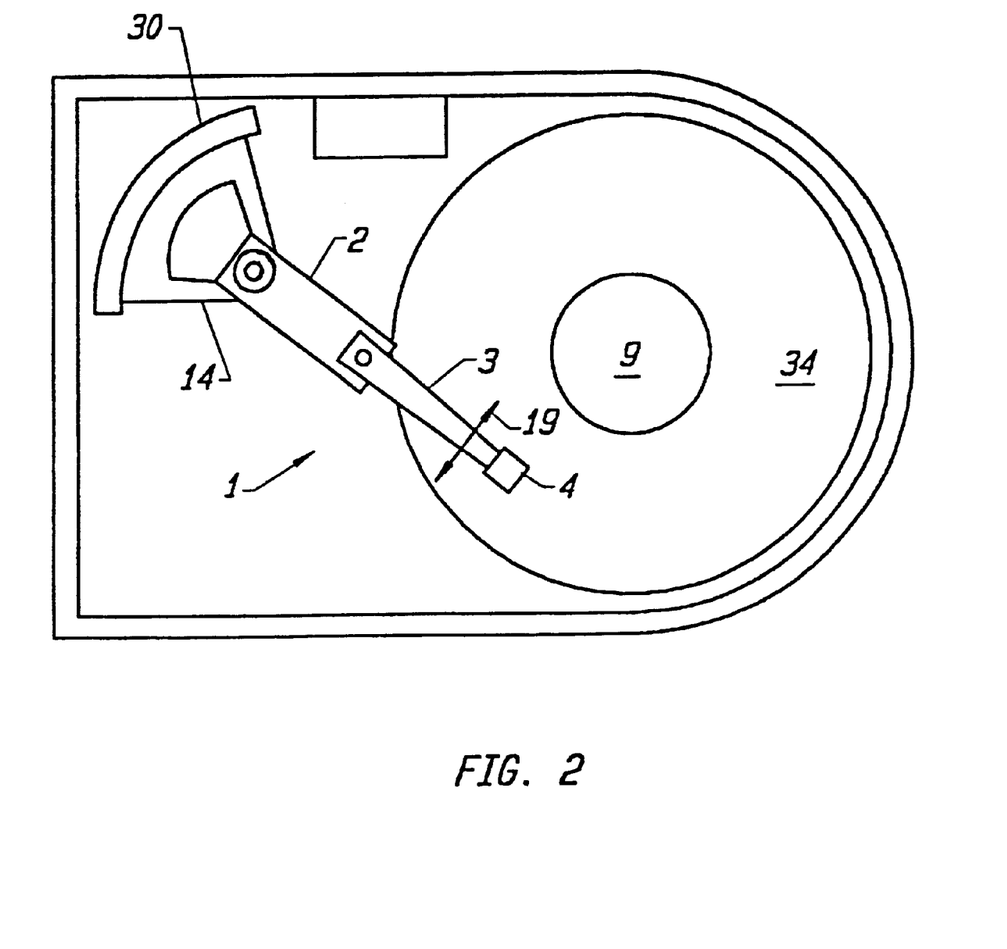
FIG. 2 is a top plan view of a disc drive system with a single actuator arm.

FIGS. 1 and 2 show the key components of a single disc drive system and a stacked multiple disc drive system, respectively. In FIG. 2, an actuator arm 1 comprises an mounting support 2, a load beam or flexure 3, and a read/write head gimbal assembly 4. The motor assembly 30 comprises a voice coil motor of a type commonly used in modern disc drives. The motor assembly could also be a stepper motor that is commonly used in older disc drives. Movement of an actuator drive arm 14 moves the read/write head gimbal assembly 4 radially across the tracks on the memory disc 34 while the disc is rotated by motor 9 until the read/write head settles on the target track. The movement of the actuator arm 1 containing the read/write head gimbal assembly 4 is shown by the arrow 19.

The type of actuator motor system or assembly does not form part of the present invention. In fact, optimal z-heights are obtained for all possible combinations of various motor assemblies/systems, actuator arms, materials and dimensions used for the various disc drive components. Placement of the outer actuator arm is intended to set gram loads as close as possible to the gram load of the inner actuator arms. By utilizing z-height compensation, the teachings of the present invention are realized.

Figure 3:
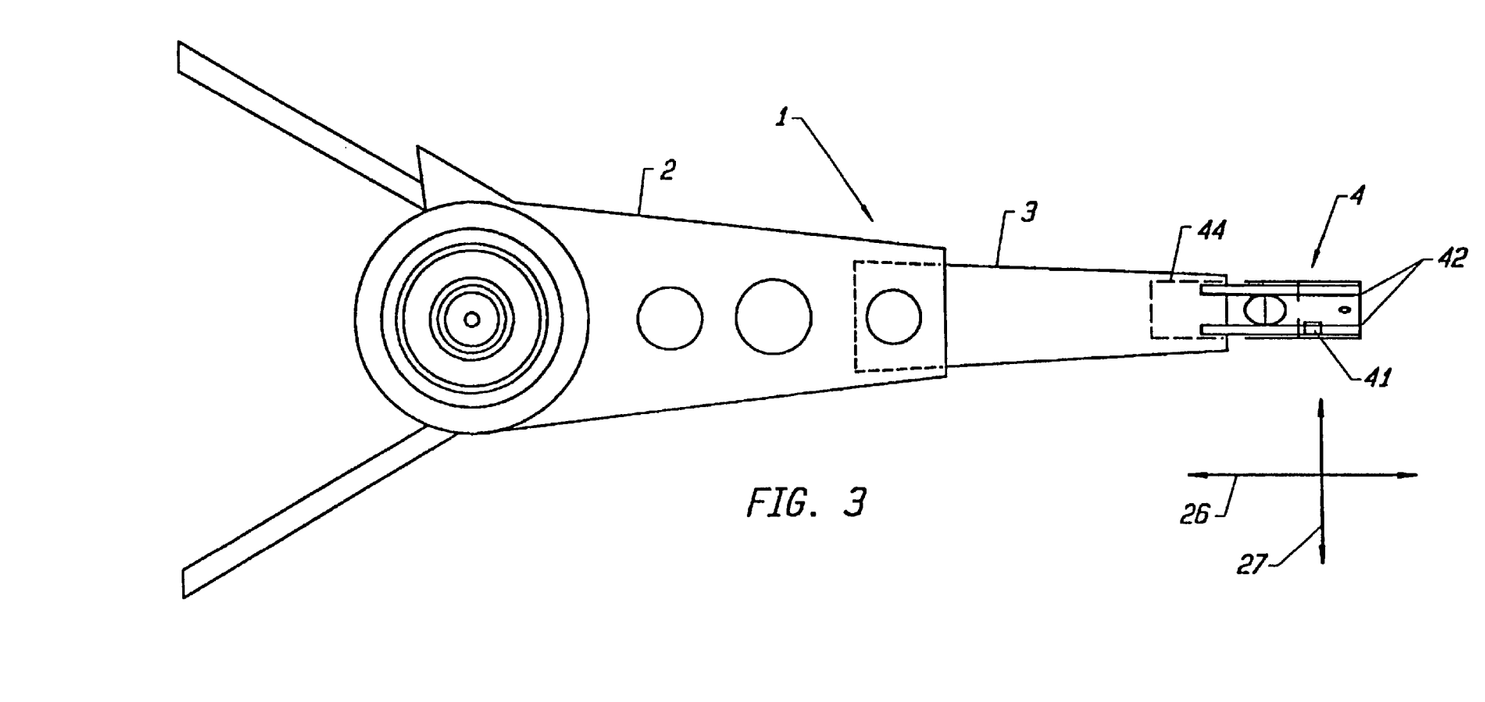
FIG. 3 is a top plan view of the inventive actuator arm showing a downwardly facing read/write head.

FIG. 3 shows a close up top plan view of a read/write head gimbal assembly 4. A gimbal 44 is coupled to the flexure 3. The gimbal 44 supports a slider 42 and a read/write head 41 in such a manner that the read/write head 41 and slider 42 can pitch and roll with respect to disc surface fluctuations. However, the coupling is such that movement of the read/write head gimbal assembly 4 in the radial direction 27 and circumferential direction 26 is restricted.

Figure 4A:
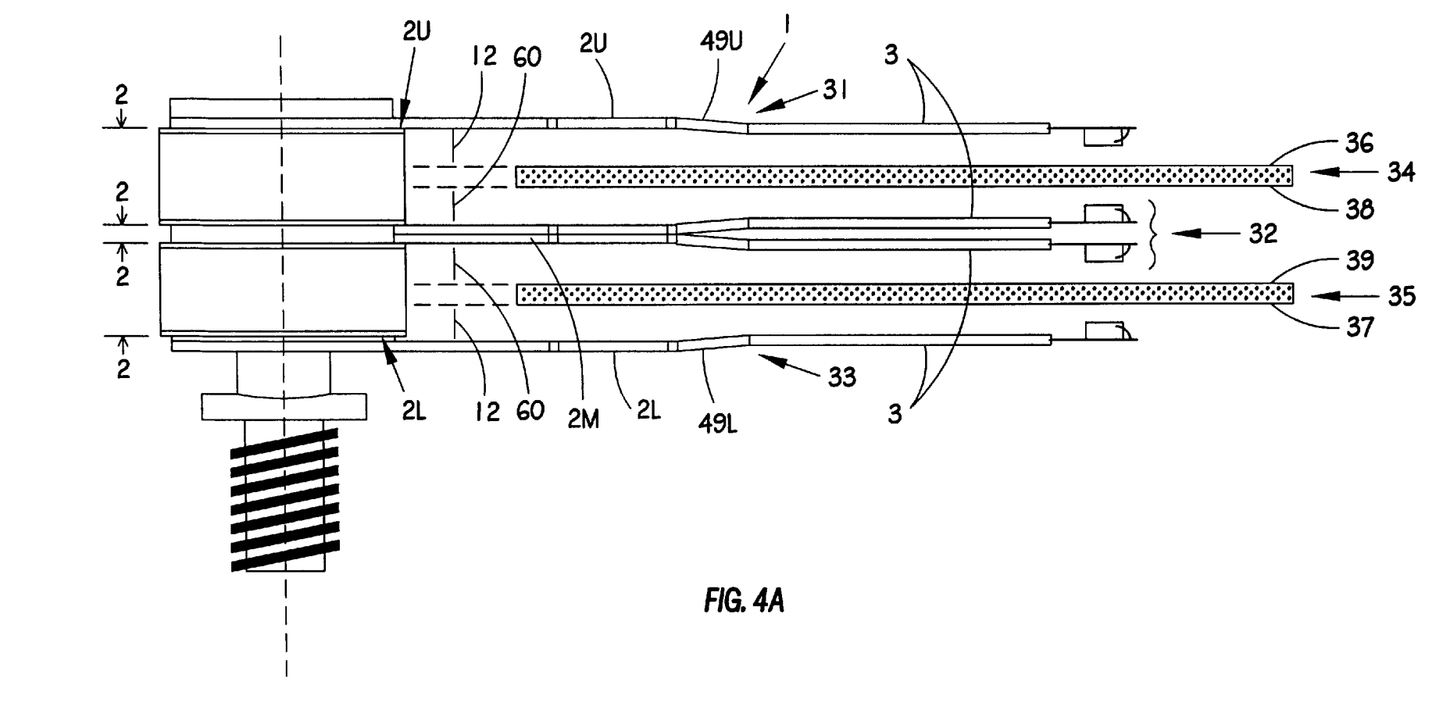
FIGS. 4A and 4B are close-up edge view of the inventive actuator arm showing the optimum z-height with reference to a memory disc.
Figure 4B:
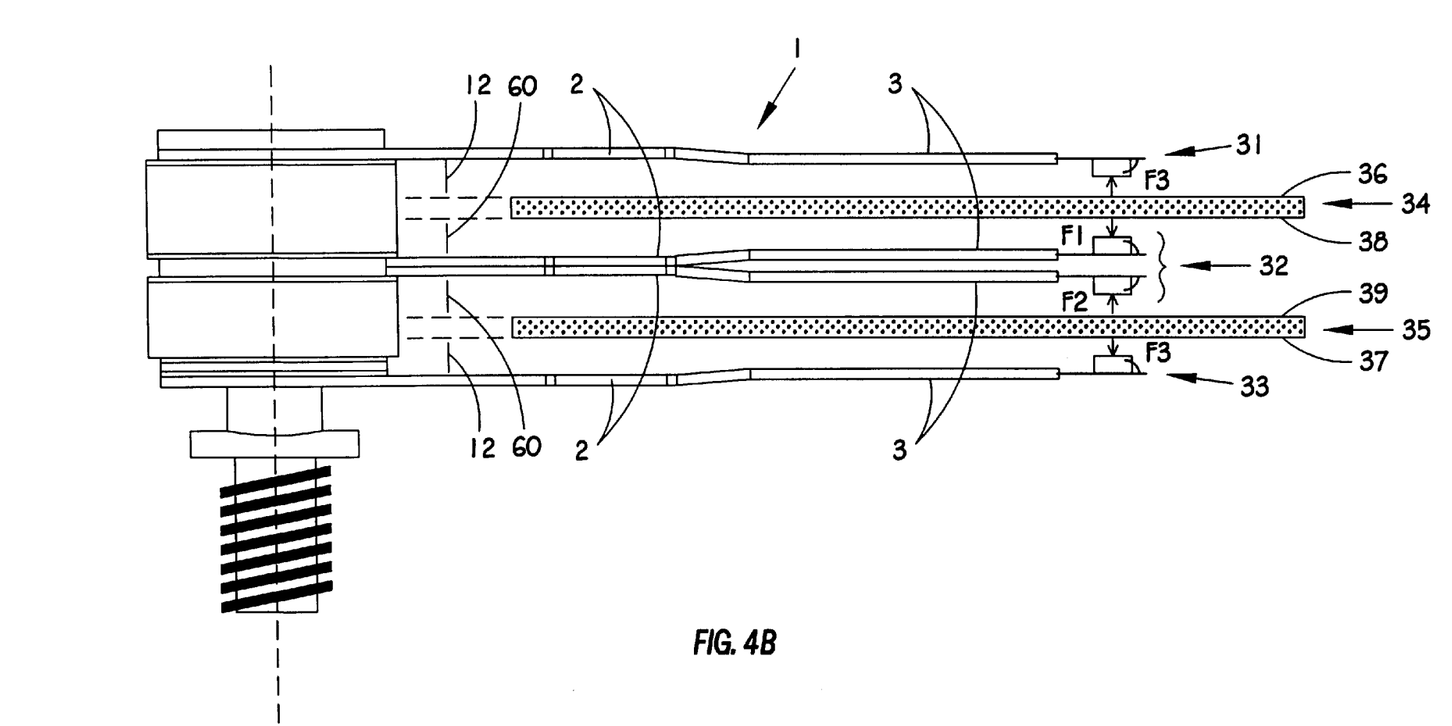

FIGS. 4A and 4B shows a close-up edge view of a stacked disc drive system. The outer upper actuator arm 31 and outer lower actuator arm 33 are positioned a particular z-height 12 from the plane of the disc surface 36 or 37 of the memory disc 34 or 35. The z-height 12 is measured from the surface of the mounting support 2 to the plane of the disc surface 36 or 37 of their corresponding memory disc. So, when the disc is at rest, the z-height is constant for the entire horizontal surface of each upper and lower mounting arms 2U, 2L.

The inner actuator arms 32 are paired together and each arm in the pair is in contact with the other arm in the pair in a back-to-back configuration. Such a configuration prevents deflection of the inner actuator arms because each inner actuator arm resists the force applied by the other inner actuator arm. Therefore, z-height compensation is inapplicable to the inner actuator arms in a back-to-back configuration. Distance 60, the z-height of the inner actuator arms, is greater than the z-height 12 of the outer actuator arms.

The z-height 60 of the inner actuator arms is measured from the surface of the mounting support 2 to the plane of the disc surface 38 or 39 of their corresponding memory disc 34 or 35. The optimum results of this invention are only achieved when the z-height 60 of the inner arms is greater than the z-height 12 of the outer arms. The reason is apparent from a review of FIG. 4B which shows the vertical forces on each slider when the discs are rotating. As noted above, forces $F_1$ and $F_2$ are equal and offsetting so that no deflection of their respective mounting arms 2M occurs. However, no force is present to offset the forces $F_3$ imposed on outer actuator arms 31, 33. The deflection due to this force $F_3$ may be calculated as $$y = F_3 l^3/3EI,$$

where $F_3$=load; E=modulus of elasticity; I=moment of inertia and is the length of the actuator arm. Thus, because of the light weight materials used, lowering the values for E and I, the flexure mounting ends 49U, 49L on FIG. 4A of the upper and lower arms 2U, 2L deflect away form the disc, causing the slider to fly too high over the disc. For example, for a disc with a target z-height of z. 0.023, an added deflection of 0.004 to 0.006 may occur.

To compensate, the z-height 60 of the inner actuator arms 2M would be set at 0.023; but the z-height of the outer actuator arms 2U, 2L, according to this invention, should be (0.023−0.004=0.019 or −0.006=0.017).

Figure 5:
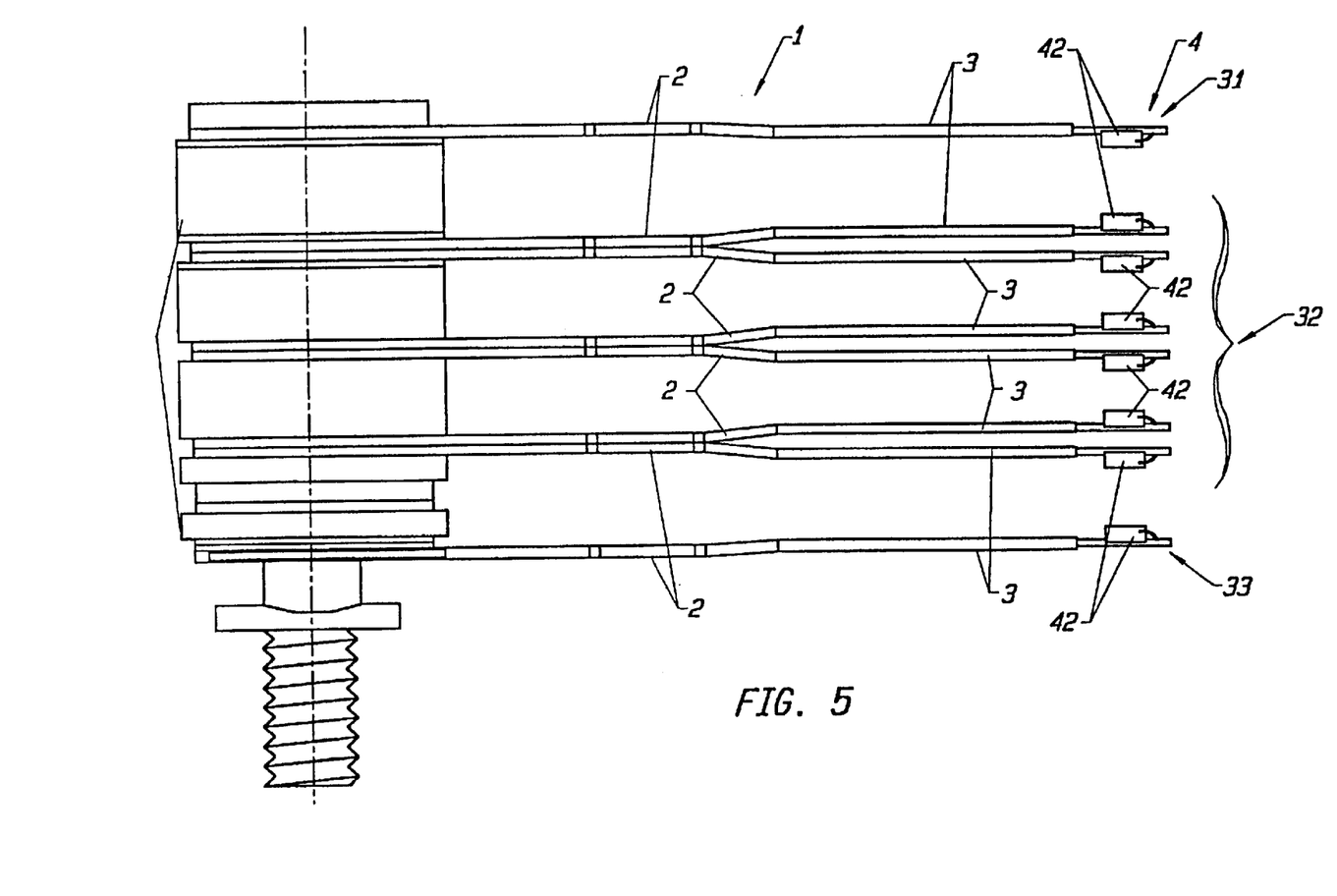
FIG. 5 is an edge view of the inventive actuator arm.

FIG. 4A shows only one pair of inner actuator arms 32. However, more inner actuator arms may be stacked as shown in FIG. 5 as long as each pair of inner actuator arms are installed in a back-to-back configuration, and appropriate compensation is made to the spacing of the outer arms.

The present invention allows the use of thin and uniform materials for the actuator arm. Thin materials allow the disc drive to have a lower profile.

Certain components of the outer actuator arms are, in one embodiment of this invention, identical in dimension. For example, in the embodiment of FIG. 4, the flexure 3 of the outer upper actuator arm 31 is substantially identical in dimension and material to the flexure 3 of the middle lower actuator arm 32. Similarly, the upper actuator arm 32 is substantially identical in construction to the outer actuator arm 33.

Figure 6:
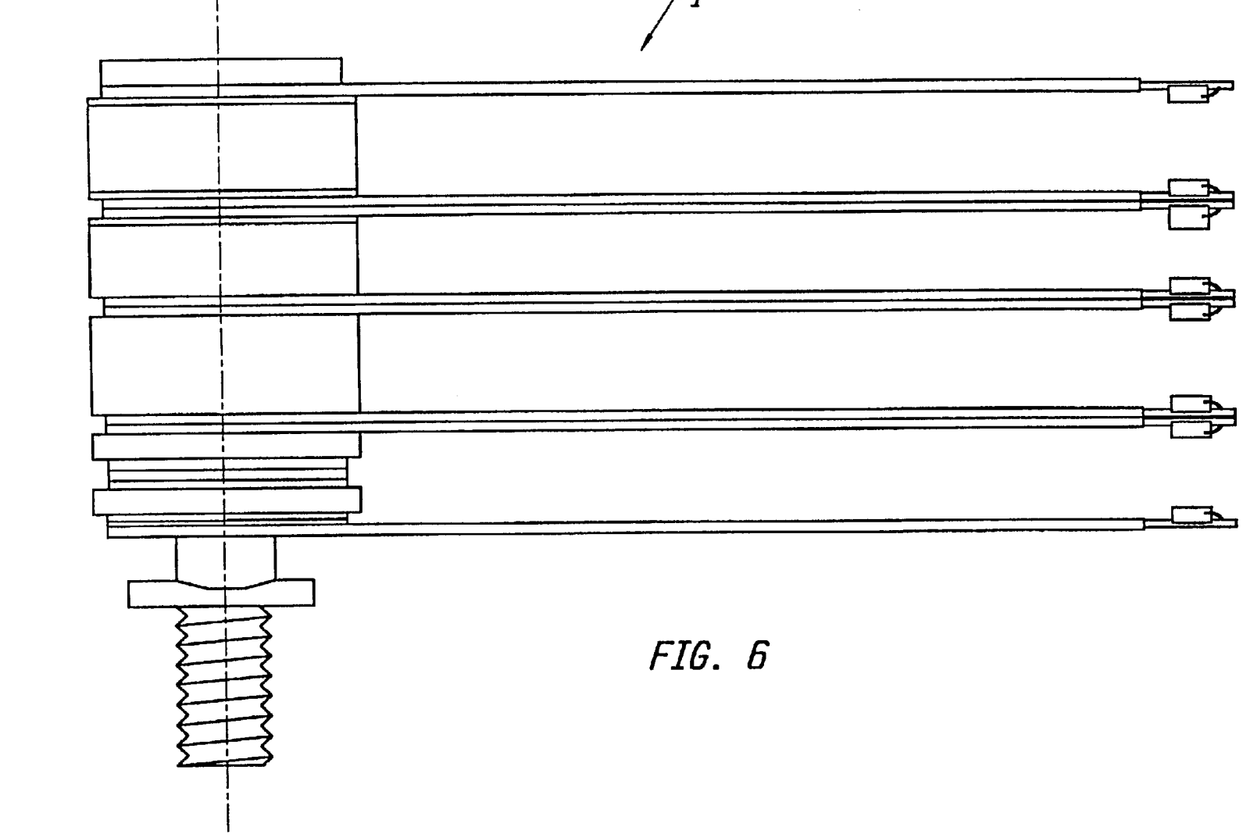
FIG. 6 is an edge view of an alternative embodiment of the present invention wherein the flexure and mounting support constitute a single unitary piece.

FIG. 6 shows an alternative embodiment of the present invention. Instead of having a separate flexure and separate mounting support to support the head gimbal assembly, a single unitary piece is used.

Figure 7:
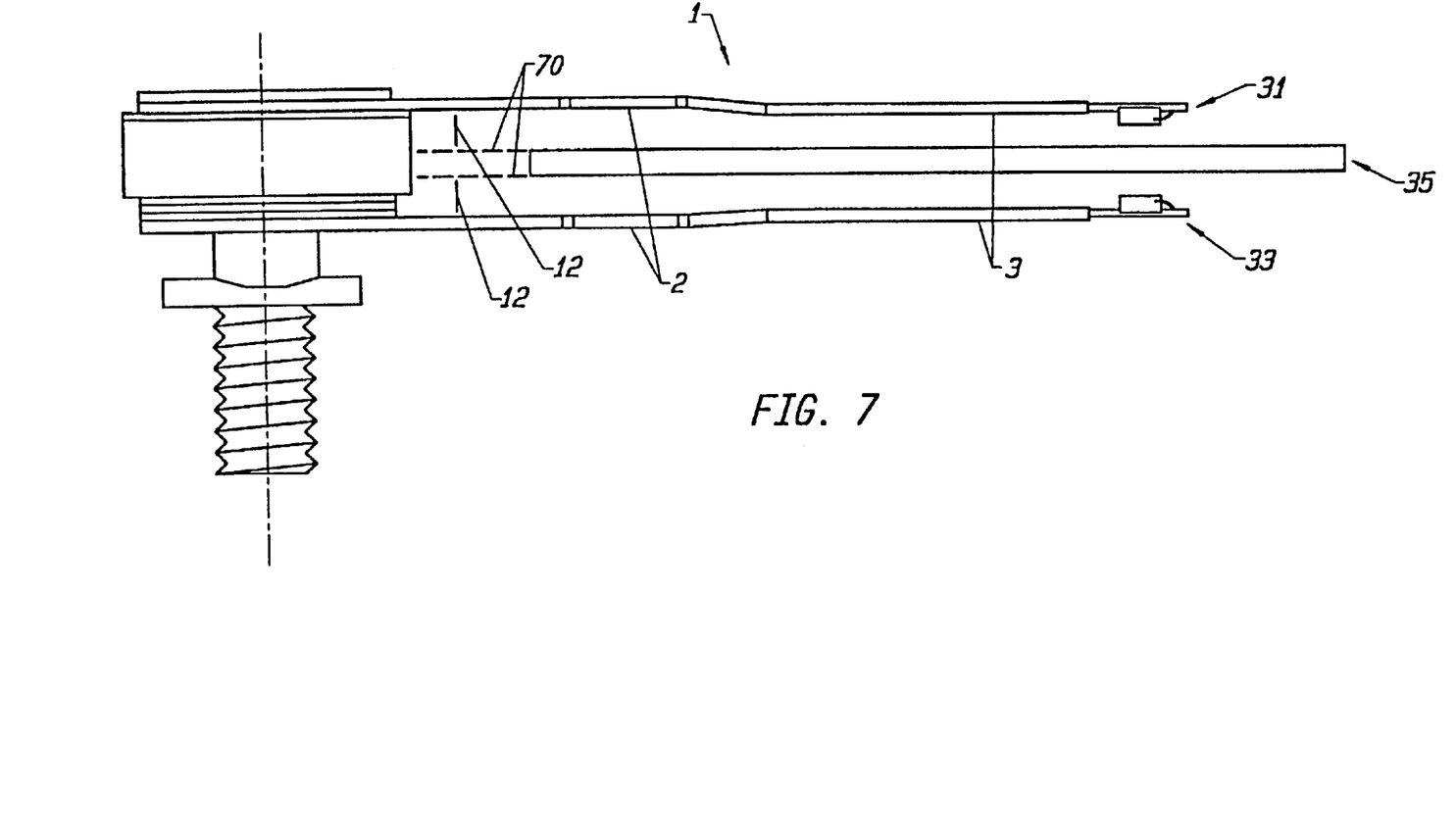
FIG. 7 is an edge view of an alternative embodiment of the present invention showing upper and lower outer actuator arms and no inner actuator arms.

FIG. 7 shows still another embodiment of the present invention. Typical in most single disc drive systems, only two actuator arms are installed—an outer upper actuator arm 31 and an outer lower actuator arm 33. Once again, the pseudo-optimum z-height 12 is measured from the mounting support 2 to the plane 70 of the memory disc surface. Z-height arm compliance compensation as taught in this invention is applicable to these arms as well.

Figure 8:
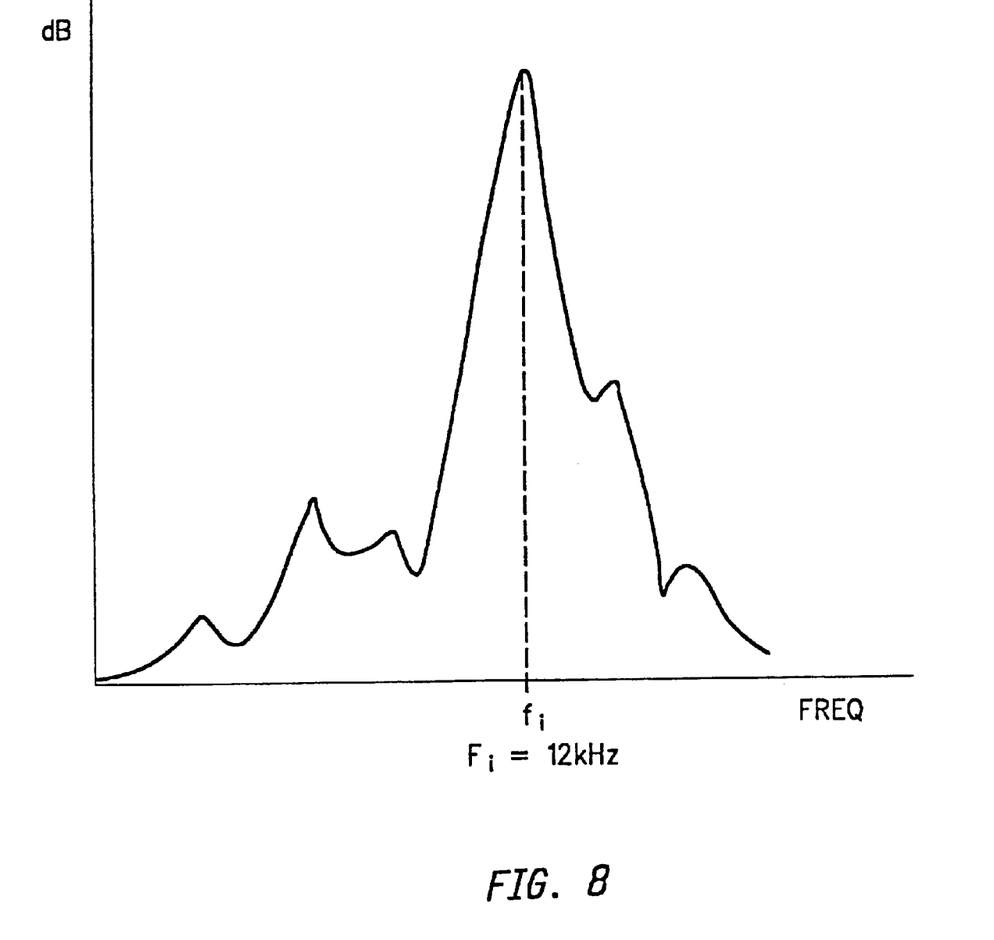
FIG. 8 is a frequency response plot of the inner actuator arms.

The frequency response, as depicted in the Bode plot of FIG. 8, shows one embodiment of the method used to determine the optimal stability of the disc drive system. The input at item 30 (FIG. 1) (voice coil motor) is measured at the slider end of the actuator arm. When a series of vibrations of a certain magnitude at a range of frequencies are entered into the system at the voice coil motor end, an output is measured at the head gimbal assembly. The term "optimal" is relative only and should not be construed to mean that the achieved stability is the most optimal.

Initially, the inner actuator arms must be installed. In this particular embodiment, the inner actuator arms are installed in a back-to-back configuration. As mentioned earlier, the back-to-back contact of the inner actuator arms is rigid and substantially without resiliency in a static sense. Such a configuration prevents deflection of the inner actuator arms because each arm resists the force applied by the other arm. Z-height compensation, in accordance with this invention, is inapplicable to the inner actuator arms with back-to-back configuration.

Once installed, a frequency response in the form of Bode plots is generated for the inner actuator arms. FIG. 8 shows one such Bode plot. A peak magnitude resonance occurs at $f_i$. This value of $f_i$ is used in subsequent measurements for comparison purposes.

The outer actuator arms, both upper and lower, are installed at a specific initial z-height $z_0$. $z_0$ corresponds to the z-height $z_n$, where n=0. The frequency response for each outer actuator arm is generated. Once the initial value and the resonance is confirmed to be close to the resonance figure of the middle arms.

Z-height compensation is also applicable to those disc drive systems containing no inner actuator arms, as shown in FIG. 7. Since no inner actuator arms with a static resonance characteristic exists, no set reference value can be used. Instead, arm compliance compensation is achieved by measuring the gram load that is desired as what is actually achieved by the bending of the outer arms, since there's no support such as the middle arms have. The main objective of the invention is to maintain a uniform gram load on the outer arms versus the inner arms. This ensures that the heads would fly the same over the disc whether they were inner arms or outer arms. It should be noted that resonance is a secondary or tertiary benefit of this invention.

Figure 9:
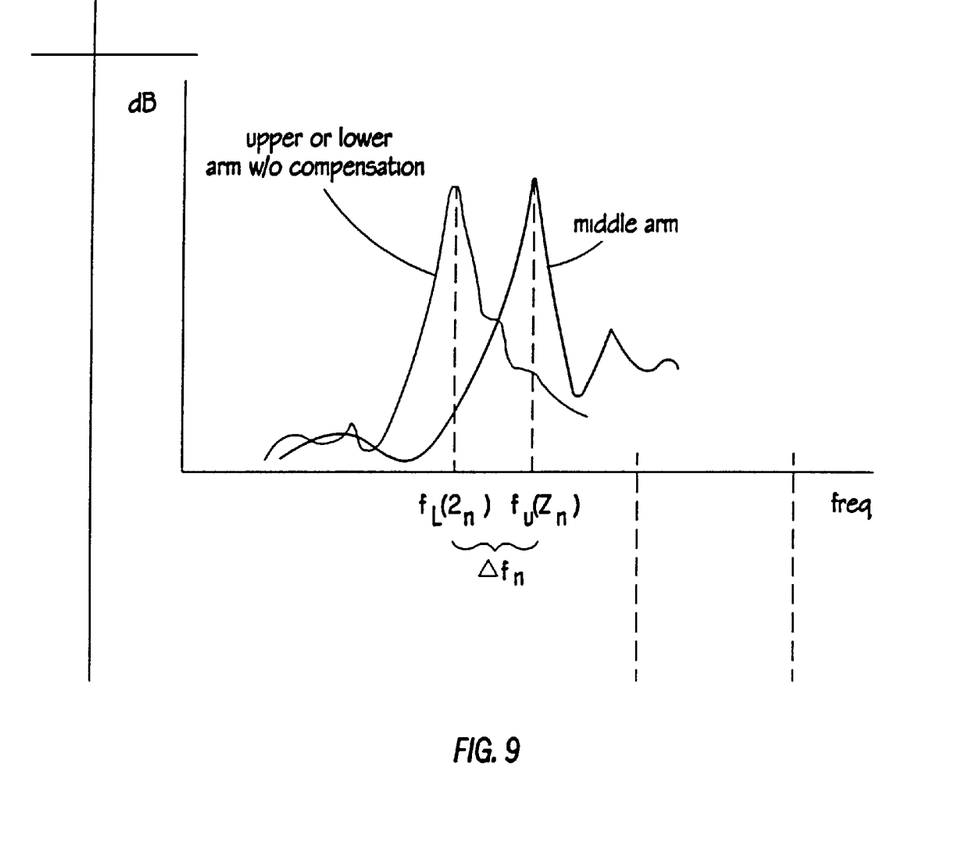
FIG. 9 shows the difference in resonance characteristics between middle arms and uncompensated outer arms.

As shown in FIG. 9, a composite frequency response at the z-height shows a possible improvement in the outer upper arm frequency to be more near the frequency response of middle arms, which is desired. FIG. 9 is exaggerated to show $\Delta f_n$ where $\Delta f_n$=the possible resonance improvement that can be achieved by this invention.

Primarily, one obtains optimal z-height by comparing gram loads on the head gimbal assemblies. Since the gram loads on the head gimbal assemblies for the inner actuator arms are preset, the task is to match as closely as possible the gram loads on the head gimbal assembly of the outer actuator arm with the gram loads of the head gimbal assembly of the inner actuator arms. Some deflection on the mounting support occurs due to this gram load. The goal is to select $z_n$ such that the corresponding gram load on the head gimbal assembly of the outer actuator arms is most close to the gram load on the head gimbal assembly of the inner actuator arms.

Although the present invention has been described with reference to a particular embodiment, additional embodiments, applications, and modifications that are obvious to those skilled in the art or are equivalent to the disclosure are included within the spirit and scope of the invention. For example, the mounting support could be comprised of more than one piece. Therefore, this invention should not be limited to the specific embodiment discussed and illustrated herein, but rather by the following claims and equivalents thereof.

It could also be made from fixed arms rather than stacked arms, as described in the invention.

What is claimed is:

1. A set of vertically aligned actuator arms in a stack arrangement for a disc drive system having at least two discs, the set comprising:

at least two inner actuator arms positioned between the two discs, each inner actuator arm including:
   an inner arm head gimbal assembly; and
   an inner arm mounting support having a first end and a second end, the second end coupled to the disc drive system and the first end coupled to the inner arm head gimbal assembly;
at least one outer actuator arm not positioned between the two discs, wherein each said actuator arm is installed at a z-height, wherein the z-height is the distance from a plane defined by a surface of a mounting support for each respective actuator arm to a plane of a memory disc surface wherein the z-height of the at least one outer actuator arm is constant along the entire plane of the surface of the mounting support between the plane of the surface of the mounting support and the plane of the memory disc when the disc is at rest, and each said outer actuator arm includes:
   an outer arm head gimbal assembly;
   an outer arm mounting support having a first opposing end and a second opposing end, the second opposing end coupled to the disc drive system and the first opposing end coupled to the outer arm head gimbal assembly,
wherein the z-height of the at least one outer actuator arm is selected by calculating the z-height for the outer actuator arm wherein a gram load applied to said outer arm head gimbal assembly is equal to a gram load on at least one of said inner arm head gimbal assemblies coupled to said first ends of said inner arm mounting supports of said inner actuator arms; and
wherein the z-height of said outer actuator arm is less than the z-height of each said inner actuator arm to match said gram loads.

2. A set of actuator arms as in claim 1 wherein the z-height of the at least one outer actuator arm is selected by comparing frequency response readings and peak magnitude resonance frequencies $f_n$ at each $z_n$, wherein $z_n$ is the distance of the plane of the surface of the mounting support for each respective actuator arm from the plane of the memory disc surface, and noting that the z-height of the at least one outer actuator arm is the particular $z_n$ that is associated with the greatest peak magnitude resonance frequency $f_n$.

3. A set of actuator arms as in claim 1 wherein the z-height of the at least one outer actuator arm is selected by comparing frequency response readings for said at least one outer actuator arm at each $z_n$, wherein $z_n$ is the distance of the plane of the mounting support for each respective actuator arm from the plane of the memory disc surface, determining a separation $\Delta f_n$ of peak magnitude resonance frequencies $f_n$ at each $z_n$, and selecting a $z_n$, where $z_n$ equals the z-height of the at least one outer actuator arm, that is associated with the smallest $\Delta f_n$.

4. A set of actuator arms as in claim 1 wherein each of said at least one outer actuator arm further comprises a flexure having a first end and a second end, the flexure having a predetermined thickness, wherein the first end of the flexure is coupled to the outer arm head gimbal assembly, and the second end of the flexure is coupled to said first opposing end of said outer arm mounting support.

5. A set of actuator arms as in claim 1 wherein components of said outer actuator arm or one of said inner actuator arms are structurally, dimensionally, and materially identical to corresponding components of another of said at least one outer actuator arm or one of said inner actuator arms.

6. A set of vertically aligned actuator arms in a stack arrangement for a disc drive system having at least two discs comprising:
   at least two inner actuator arms positioned between the two discs and at least one outer actuator arm not positioned between the two discs of a stack of vertically aligned actuator arms, each actuator arm including:
      a head gimbal assembly; and
      a mounting support having a first end and a second end, the second end coupled to the disc drive system and the first end coupled to the head gimbal assembly;
   each said actuator arm is installed at a z-height, wherein the z-height is the distance of a plane defined by a surface of a mounting support for each respective actuator arm from a plane of a memory disc surface wherein the z-height of the at least one outer actuator arm is constant along the entire plane of the surface of the mounting support between the plane of the surface of the mounting support and the plane of the memory disc when the disc is at rest,
   wherein the z-height of the at least one outer actuator arm is selected by calculating the z-height for said outer actuator arm wherein a gram load applied to said head gimbal assembly coupled to said first end of said mounting support of said outer actuator arm is equal to a gram load on said head gimbal assembly coupled to said first end of said mounting support of at least one of said inner actuator arms; and
   wherein the z-height of said outer actuator arm is less than the z-height of each said inner actuator arm to match said gram loads on said head gimbal assemblies of said inner actuator arms.

* * * * *